UNITED STATES PATENT OFFICE.

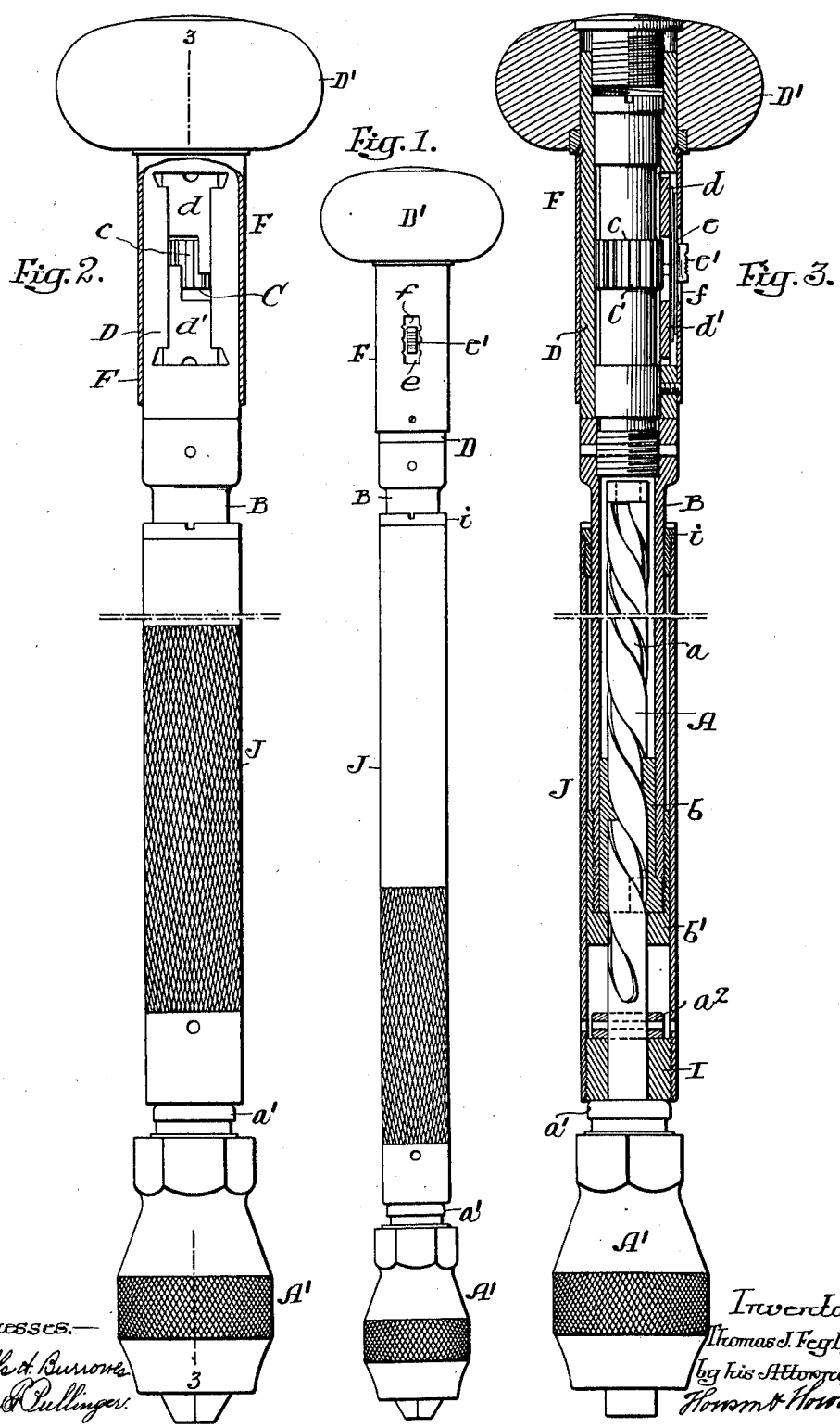

THOMAS J. FEGLEY, OF PHILADELPHIA, PENNSYLVANIA, ASSIGNOR TO NORTH BRO'S M'F'G CO., OF PHILADELPHIA, PENNSYLVANIA, A CORPORATION OF PENNSYLVANIA.

SPIRAL SCREW-DRIVER AND DRILL.

1,022,311. Specification of Letters Patent. Patented Apr. 2, 1912.

Application filed January 10, 1910. Serial No. 537,246.

*To all whom it may concern:*

Be it known that I, THOMAS J. FEGLEY, a citizen of the United States, residing in Philadelphia, Pennsylvania, have invented certain Improvements in Spiral Screw-Drivers and Drills, of which the following is a specification.

The main object of this invention is to provide a spiral screw driver or drill with a long grip section, so that the tool can be gripped at any point throughout its length by one hand while it is reciprocated by the other hand.

A further object is to protect the spiral spindle and nut from dust and dirt.

The invention is particularly adapted for the use of car builders and others where some of the parts are inaccessible with a short screw driver or drill, and while it is of advantage to hold the tool as near the chuck as possible, in some instances it is only practical to hold the tool a distance away from the chuck.

In the accompanying drawing:—Figure 1, is a side view showing the full length of drill not extended; Fig. 2, is a view similar to Fig. 1, partly in section drawn on an enlarged scale, with a portion cut out; and Fig. 3, is a sectional view on the line 3—3, Fig. 2.

A is a spindle having a spiral groove $a$ cut therein, adapted to a nut $b$ secured to the shell B by a cap $b'$. The inner end of this spindle is reduced and rests in a socket in the end of a ratchet spindle C, which is secured to the shell B and on this spindle is a ratchet wheel $c$, with which engage the pawls $d$, $d'$, pivotally mounted in the shell D. The shell is provided at its upper end with a hand hold D'.

$e$ is a shifter having a portion $e'$ which projects through a slot $f$ in the casing F encircling the shell, so that on moving the shifter to the central position the chuck A', carried by the spindle A, will be positively driven first in one direction and then in the other direction as the tool is reciprocated.

When the shifter is moved to the lowest position then the tool will positively turn to the right and ratchet to the left, and when moved to the upper position the tool will turn to the left and ratchet to the right. I lay no claim to this ratchet mechanism, as any suitable ratchet mechanism may be used.

I is a sleeve mounted on the spindle A between the end $a'$ of the chuck and a ring $a^2$ secured to the spindle, so that the sleeve has no longitudinal movement independent of the spindle, but is free to rotate without rotating the spindle. Mounted on this sleeve is a long tube J, in the present instance the tube is threaded and adapted to the threaded periphery of the sleeve and the opposite end of the tube is threaded, and adapted to the tube is a sleeve $i$ through which slides the shell B. By this construction I provide an extended handhold for one hand of the operator, so that the tool can be held either close to the chuck or at a point close to the handhold, according to the location of the hole to be drilled or the screw to be driven. Part of this handhold or tube J is roughened so that a better grip can be had on the tool, and this roughened surface may extend the full length of the sleeve, if desired. Furthermore the tool can be passed into a comparatively small opening and readily operated by grasping the outer end of the tube J.

The shell protects the spiral spindle from injury and as it is closed both at top and bottom dirt or dust cannot gain access to the spiral groove or the nut $b$. In this type of tool the nut cuts away very rapidly, owing to dust gaining access to the space between the threads of the nut and the spindle.

I claim:—

The combination in a ratchet tool, of a spiral spindle, a chuck at one end of the spindle, a ratchet spindle in which the other end of the spindle is seated, a shell attached to the said ratchet spindle and a nut carried by the said shell through which the spiral spindle extends, a ratchet wheel on the ratchet spindle, a shell inclosing said spindle, pawls mounted on the shell and arranged to engage the ratchet wheel, a casing inclosing the shell and slotted, a shifter for the said pawls extending through the slot, a hand hold at the outer end of the shell inclosing the ratchet spindle, with an extended tubular hand hold mounted adjacent to the chuck so as to turn freely on the spiral spindle and on the first mentioned shell which incloses the spindle, the said hand hold being held so as to move longitudinaly with the spindle whereby an extended hand hold for the spindle is provided, which also prevents the entrance of dust to the spiral groove of the spindle and to the nut through which it extends.

In testimony whereof, I have signed my name to this specification, in the presence of two subscribing witnesses.

THOMAS J. FEGLEY.

Witnesses:
WALTER CHISM,
WM. A. BARR.

Copies of this patent may be obtained for five cents each, by addressing the "Commissioner of Patents, Washington, D. C."